Figure 1:
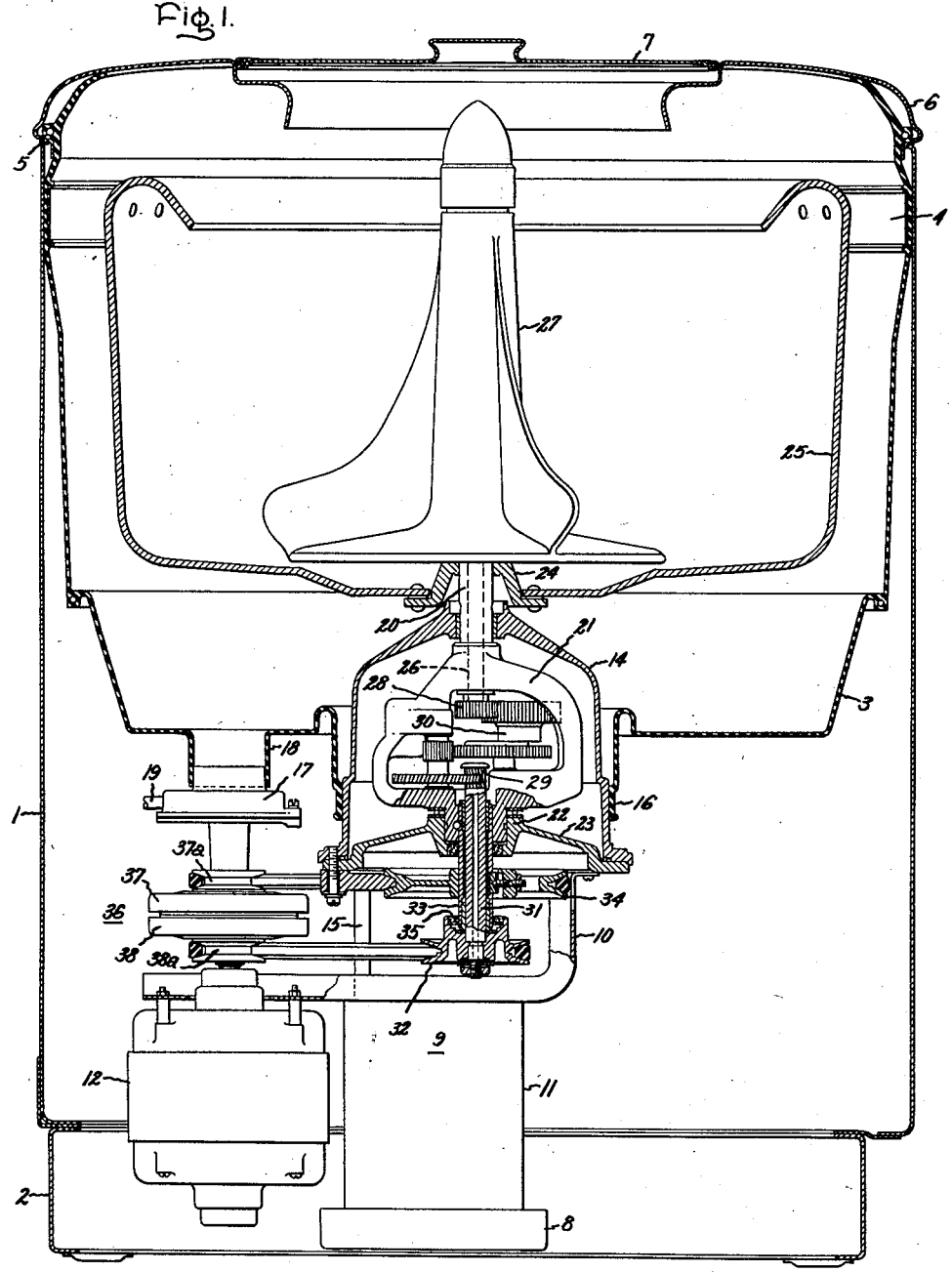

May 26, 1953  J. W. McNAIRY  2,639,794
DRIVE CLUTCH FOR WASHING MACHINES OR THE LIKE
Filed May 26, 1950  3 Sheets-Sheet 2

Inventor:
Jacob W. McNairy,
by *His Attorney.*

May 26, 1953 J. W. McNAIRY 2,639,794
DRIVE CLUTCH FOR WASHING MACHINES OR THE LIKE
Filed May 26, 1950 3 Sheets-Sheet 3
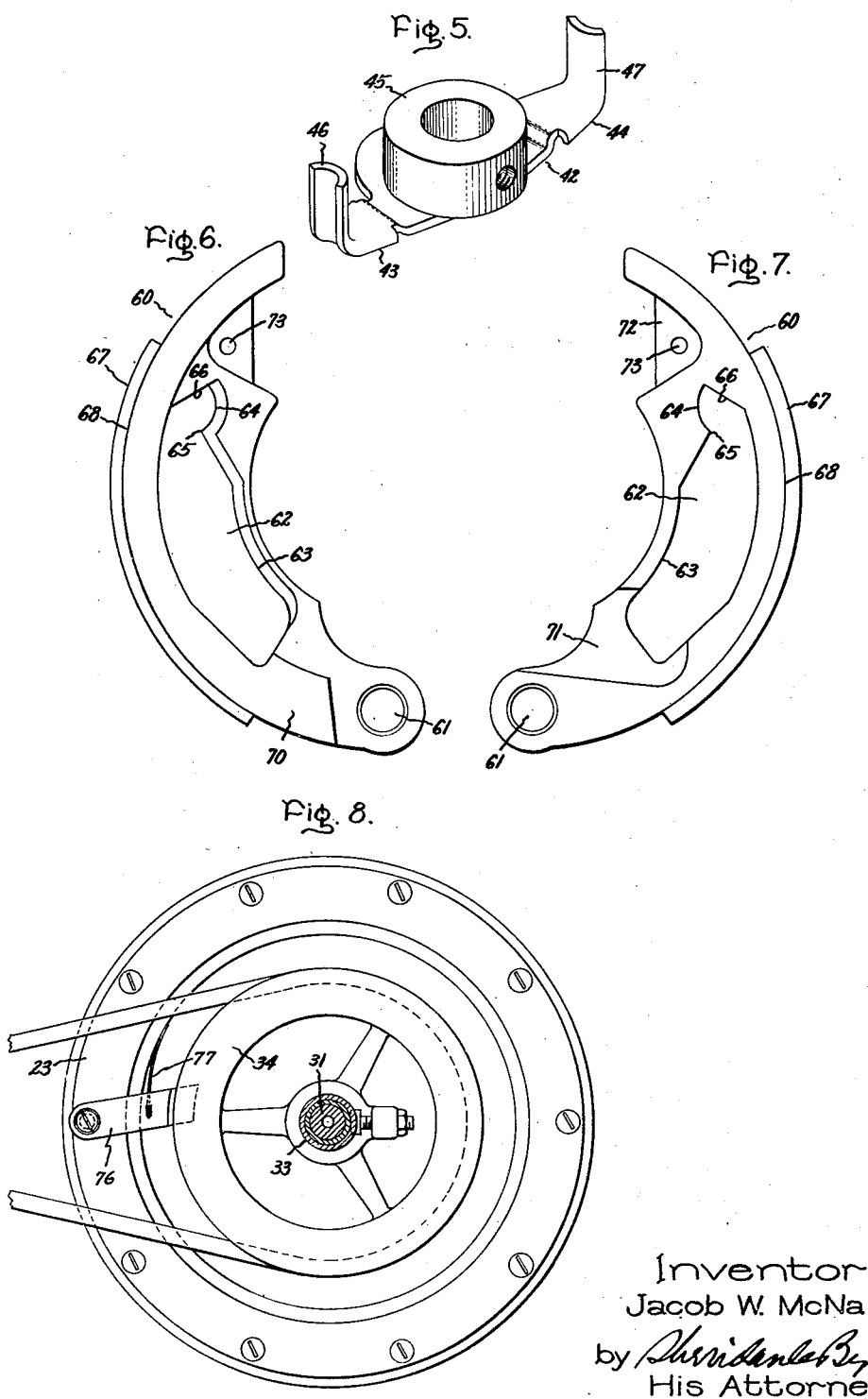
Inventor:
Jacob W. McNairy,
by *His Attorney*.

Patented May 26, 1953

2,639,794

UNITED STATES PATENT OFFICE 2,639,794

DRIVE CLUTCH FOR WASHING MACHINES OR THE LIKE

Jacob W. McNairy, Westport, Conn., assignor to General Electric Company, a corporation of New York Application May 26, 1950, Serial No. 164,427

13 Claims. (Cl. 192—48)

This invention relates to an improved, two-directional, centrifugal clutch. In particular, I have directed my invention to a clutch to be employed in the driving mechanism of clothes washing machines of the type utilizing a single receptacle within which the clothes are washed and then dried by centrifugal extraction.

Among the objects of my invention are: to provide an improved drive mechanism pursuant to which the operation of a washing machine may be changed from washing to centrifugal extraction merely by reversing the direction of rotation of the driving means; to provide an improved direction-responsive clutch to drive either of two drive elements according to the direction of rotation of the power input to the clutch; to provide a clutch having drive shoes which transmit driving torque to either of two clutch drums or the like according to the rotational direction of the drive shaft and in addition provide torque and speed control to insure that the drive motor will always deliver without stalling the maximum torque of which it is capable; to provide a simplified clutch construction which may be assembled or repaired by relatively unskilled labor and will operate over long periods of time without mechanical failure; and to provide an improved clutching action which will permit the drive motor to get a free start and to be loaded relatively gradually, thus minimizing the possibility of motor or line overload.

In a presently preferred form of the invention I provide a pair of cup-like clutch drums arranged concentrically and in opposing relation to form a chamber. Each drum carries a sheave or the like by means of which the drum rotation may be transmitted to a shaft to be driven. Within the clutch drum chamber are a pair of driving shoes individual to each drum and pivotally mounted in superimposed relation on a common supporting member. A driver is fixed to the driving shaft within the chamber. Substantial operating advantages derive from the operation of the driver with respect to the driving shoes. To insure that only the shoes associated with a particular drive direction engage a clutch drum, the driver positively holds the other pair of shoes out of driving position and transmits motor torque to the driving shoes through the non-driving shoes. The driving shoes are thus unencumbered, and free to throw out centrifugally into engagement with the associated clutch drum as the motor picks up speed. This arrangement provides a free motor start which permits the use of a relatively low cost resistance start motor, and the centrifugal force necessary to transmit torque from the shoe to the clutch drum protects the motor and the motor service line against overloads.

Figure 2:
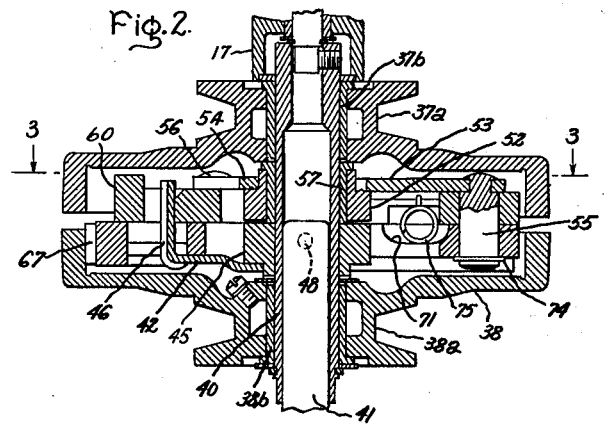
Figure 3:
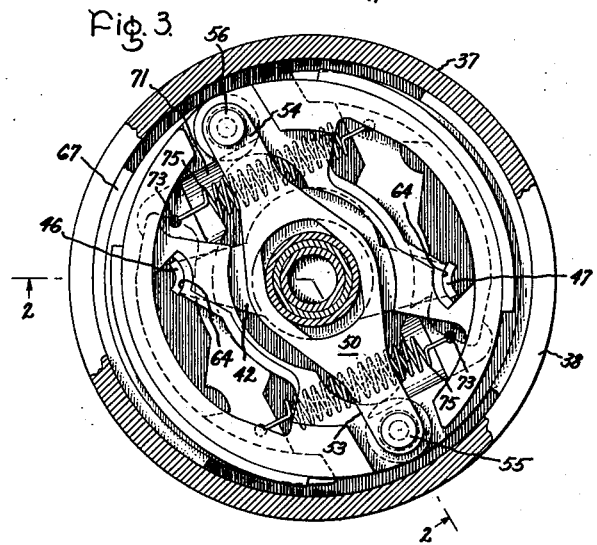
Figure 4:
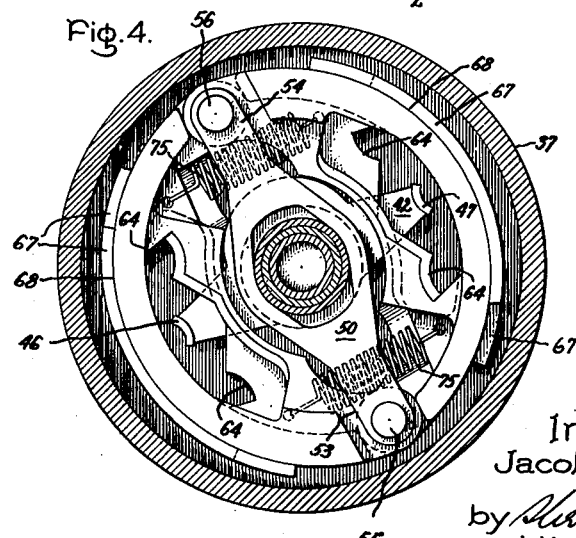

Other features and advantages of my invention will be apparent in the following detailed description of the presently preferred construction shown in the accompanying drawings in which Fig. 1 is a vertical sectional elevation of a washing machine embodying drive means including my improved clutch; Fig. 2 is a sectional elevation taken through a clutch embodying my invention, the section being taken on lines 2—2 of Fig. 3; Fig. 3 is a plan section of the clutch in Fig. 2 taken along lines 3—3 of Fig. 2; Fig. 4 is a view similar to Fig. 3 but showing the relative position of the drive shoes immediately following the instant of reversal of the drive motor; Fig. 5 is a perspective of the driver member; Figs. 6 and 7 are respectively obverse and reverse views of a drive shoe; and Fig. 8 is a bottom plan view showing the spin basket drive sheave and snubber means for preventing progression of the basket during operation of the washing device.

Although my clutch construction is, of course, adapted for use with other than washing machines, I have chosen to describe its operation with a domestic washing machine of well known type because in such service the load imposed on the motor and its torque transmitting means are quite severe. For example, during the washing cycle the motor—which is of fractional horsepower—drives a relatively wide-bladed agitator which oscillates in a receptacle which may contain as many as 9 pounds of clothes and 17 gallons of water; and following such washing operation the basket is brought from a standstill to a rotational speed of the order of 700 R. P. M. for centrifugal extraction of the water. Because of inadequacies all too common in domestic electric wiring, such washing machine performance is often demanded when the power available at the motor is below rated voltage. A clutch embodying the present invention provides speed response which will prevent the motor from stalling at low speeds; if the motor tends to slow down, the torque is released.

A commercially popular domestic washing machine (see Fig. 1) includes an outer casing 1 having a rigid base frame 2 and a tub 3 suitably secured within the casing as by a clamping band 4 and means for fastening an upper flange 5 of the tub to the upper periphery of the casing. As illustrated, the tub is molded from rubber or the like and is flexible; this is by way of example only, and is without importance as respects the instant invention. The cover 6 and removable lid 7 complete the casing structure. Fixed to a transverse frame member 8 extending between and secured to opposite walls of the base frame 2, is a mounting structure 9 which includes an angular support member 10 fixed to a resiliently mounted pedestal 11. An overhanging end of member 10 carries a drive motor 12. The member 10 supports a gear casing 14 by any suitable means; for example, by directly affixing the extremity of the member 10 to a base plate of the casing 14 and employing studs or equivalent spacer means 15. The mounting structure may be similar to that disclosed and claimed in the C. L. Reitz et al. application, Serial No. 164,382, filed on even date herewith and assigned to my present assignee.

The gear casing 14 extends into the tub 3 by passage through a neck 16 thereof. As will be obvious, said neck is suitably fastened to the cylindrical wall of casing 14 by conventional clamping means (not shown) which insure against leakage from the tub. The motor 12 is drivingly associated with a pump 17 having an inlet clamped within a depending drain neck 18 of the tub. Said pump is unidirectional and when rotated in proper direction will discharge the contents of the tub 3 through outflow 19 connected to any suitable disposal conduit (not shown).

Extending from casing 14 is a tubular shaft 20 which is fixed to a gear frame 21 having a hub journaled in a bearing 22 in the casing base plate 23. Fixed to said shaft 20 is a collar 24 to which is affixed a basket 25 within which the clothes are washed and dried. Independently rotatable within the tubular shaft 20 is a shaft 26 carrying at its upper end a washing device or agitator 27. Shaft 26 carries at its lower end a pinion 28 which is in mesh with a gear train 30 driven by a pinion 29 affixed to the end of a drive shaft 31. Gear train 30 includes conventional sector gears and the like to cause an oscillation of the washing device 27. The gear train, for example, may be as shown and described in the application of Thomas T. Woodson, Serial No. 639,817, filed January 8, 1946 for "Control for Automatic Washing Machine" and assigned to the assignee herein. Shaft 31 has a sheave 32 fixed thereto; said shaft operates within a tubular shaft 33 pinned to the hub of gear frame 21 to drive the same. Shaft 33 is driven by a sheave 34 thereon. Escape of lubricant from the gear casing may be prevented by a suitable seal 35 within the extended hub of sheave 32.

When the basket is filled with water by a suitable means (not shown) the gear frame 21 is held stationary as later described and the gearing 30 oscillates shaft 26 and its thereon supported agitator 27. The basket 25 remains stationary during this operation for the reason that the basket is connected to gear frame 21 and will rotate only when said frame is rotated. When the basket is to be spun, shaft 33 is rotated and shaft 31 disconnected from power. The agitator 27 will rotate idly with the basket due to the coupling effect of the water content of the basket, friction drag, and other factors.

The respective washing and drying operations are selectively accomplished by reversing the rotation of the motor 12 and driving one or the other of the sheaves 32, 34 by means of a direction-responsive clutch 36.

A presently preferred form of clutch comprises drums 37, 38 of equal inside diameter and journaled in opposing relationship on a shaft 40 which may conveniently be a sleeve telescoped over the drive shaft 41, see Fig. 2. According to preference or particular installation requirements the drive shaft may comprise the rotor shaft of a reversible motor or the output shaft of a reversing gear train externally driven. It is economical and structurally satisfactory to utilize the hubs of the respective clutch drum sheaves 37a, 38a for supporting the drums on shaft 40. Lubrication of a semi-permanent type may be assured by utilizing conventional bearing sleeves 37b, 38b of oil-retaining porous bronze material and packing the hub channels with suitable lubricant. Ball or other conventional bearing types may of course be employed if desired. It will be understood that whereas the respective sheaves 32, 34, 37a and 38a adapt the mechanism for belt drive, said sheaves may be supplanted by gears or equivalent when other power transmission systems are in order.

The means by which drive shaft torque is transmitted to one or the other of the clutch drums according to the rotation of the shaft include a drive 42, a carrier 50 and a plurality of clutch shoes 60. The driver (see Fig. 5) includes arm members 43, 44 extending from a hub 45 which fits over shaft 40 with close tolerance, said arm members respectively terminating in the fingers 46, 47. I prefer to shape the drive arm portions from suitable sheet metal stock, or by casting the arms and fingers integral with the hubs 45. The advantage of such constructions is that the fingers are then integral with their respective arms. However, it will be seen that fingers 46, 47 may with equal facility comprise pins or studs suitably affixed to the arm structure. Where the driver is to transmit equal torque for both directions of rotation, it is important whatever the method of construction that the convex surfaces of the fingers be cylinders or sectors of cylinders of the same radius and that their axes be equally spaced from the axis of hub 45. Said hub is tapped to receive a screw 48 (Fig. 2) by means of which the hub is secured and not only to shaft 40 but to shaft 41, the respective shafts being radially drilled to receive the screw.

Carrier 50 includes an arm member welded or otherwise secured to hub 52 to provide the uniform arm portions 53, 54. Each said arm portion has a stud respectively 55, 56 secured thereto, the axes of said studs being equidistant from the axis of hub 52. By suitable means such as the sleeve bearing 57 the carrier 50 is freely rotatable on shaft 40.

Clutch shoes 60, shown in obverse and reverse respectively in Figs. 6 and 7, are arcuate structures having apertures 61 by means of which the shoes rotatably fit on the carrier arm studs. Each shoe is formed with an opening 62 of which an inner wall 63 provides a notch 64 remote from the pivot aperture 61. The radius of the notch is substantially the same as that of the convex wall of the respective fingers 46, 47. The notches hold the fingers against accidental disengagement from the inactive drive shoes in the event of a momentary interruption of power while the machine is up to speed, under which condition the spinning basket would drive the clutch, reversing the torque. The fingers enter the notches by camming past the peak 65 and seat against the end wall 66. The peak 65 is effective in preventing the reverse clutch torque from shifting the clutch to a point where it might operate the agitator clutch drum, as long as the speed is high enough so that centrifugal forces keep the shoes in engagement with the drive fingers. Each shoe is provided with a strip of friction material 67 to engage with the inner surface of the adjacent clutch drum. Said strip may be riveted or adhesively bonded to the outer drive shoe face 68 according to conventional practice. The woven or compressed materials commonly used for automobile brake linings and clutch facings are entirely satisfactory. The construction of the shoe is such as to dispose the center of gravity thereof toward the outer wall 68 and to provide an outer wall depth sufficient to insure adequate friction area. Each of these objectives is conveniently accomplished by making the thickness of the area 70 of the shoe substantially greater than that of the remainder. The respective thickness of the shoe areas appears to better advantage in Fig. 2. The reverse side (Fig. 7) is substantially planar except for the concavity 71 and the hollow 72 which provides a relatively thin web pierced by the spring securement opening 73.

The pairs of clutch shoes are arranged one over the other in a back-to-back relationship on the respective studs 55, 56. Where space limitations are important the respective pairs of shoes overlie each other closely, and planeness of their reverse faces is advantageous. It would perhaps be preferable, space permitting, to lengthen studs 55 so that the upper and lower shoes mounted thereon could be in substantial spaced relation. In any event, the shoes may be supported on the studs by conventional means such as a snap ring 74. Each clutch drum will be engaged by the friction material on shoes which are respectively pivoted at the opposite end of the carrier 50. In the arrangement in Fig. 2 the lowermost pair of shoes is in operative position with the respective friction surfaces engaging the lower clutch drum 38. The uppermost shoes as viewed in Fig. 3 are locked inactive by the engagement of the fingers 46, 47 within the respective notches 64 of the shoes. It will be noted that each of the inactive upper shoes is resiliently connected to a lower shoe by a spring 75 the ends of which hook through the spring receiving hole 73. The concavities 71 of the respective shoes are to accommodate the passage of the spring as better appears in Fig. 2.

In Fig. 3 it is assumed that the drive shaft and its associated driver 42 are rotating clockwise. The fingers of the driver have cammed into the notches 64 of the upper shoes and the motor torque is being imposed directly upon the said upper shoes. These upper shoes, being pivotally affixed to the carrier 50, are therefore enforcing a clockwise rotation of said carrier. The lower shoes, of which the left hand shoe is pivoted on stud 56 and the right hand shoe on stud 55 as viewed in Fig. 3, are thrown outwardly by centrifugal force engendered by the rapid rotation of the carrier 50 and their respective friction members 67 are in frictional driving engagement with the drum 38. There is, of course, some tendency for the uppermost shoes to fly outward but this is limited by the respective fingers 46, 47. The springs 75, however, are placed under light tension and are constantly biasing all of the shoes to an inactive position.

When the motor is brought to a stop and then reversed, the driver 42 will disengage from the notch in which it had been seated and will traverse the openings in the superimposed shoes to reach the opposite end notches of the lower shoe. The springs 75 having brought the respective upper and lower shoes to the Fig. 4 position are holding the shoes out of engagement with either of the clutch drums 37 or 38, thereby giving the motor a free start. The carrier and the clutch shoes driven thereby pick up speed rapidly and under centrifugal force the upper shoes will swing outwardly for frictional engagement with the wall of clutch member 37. Even then, the initial slippage along said wall delays the loading of the motor. The free start and gradual load imposition permits the motor 12 to be of the relatively less expensive resistance start type despite the relatively low starting torque characteristic of said motors.

The speed at which the drive shoes will engage the associated clutch drum wall to transmit torque therto may be established within a reasonably flat performance range by appropriately proportioning the loading or weight of the drive shoes and the strength of the springs. Thus, each set of torque transmitting members provides both directional response and speed control. The clutch, regardless of its direction of operation, adjusts its torque transmission to motor speed; upon a reduction of speed below a predetermined minimum, the torque is released.

The sheave 38a is belt connected to sheave 32 which is affixed to the end of shaft 31 which drives the gear train for operation of the agitator shaft 26, as previously explained. The direction of rotation of said shaft is counterclockwise as viewed in Fig. 8. The agitator shaft 26 will oscillate only if gear frame 21 is held against rotation in the same direction as the shaft 31. This may conveniently be accomplished by holding the sheave 34 against rotation inasmuch as said sheave is keyed to the drive shaft 33 which in turn is pinned to hub 24 of the gear frame 21. Accordingly, I employ a snubber 76 pivotally mounted on the base plate 23 of the gear casing 14 and biased, as by spring 77, to seat within the belt groove of sheave 34. By having the snubber 76 engage with the sheave in angular relation opposing the rotation of sheave 32, sheave 34 is restrained against counterclockwise rotation. The agitator will make one-half of its stroke within a stationary basket 25 although the basket is relatively free to progress under the influence of water movement during the opposite portion of the agitator stroke. However, the agitator torque during said last-named portion of its stroke is substantially less and corespondingly the basket 25 lags behind the agitator movement to such an extent that there is at all times a relative movement of the agitator with respect to the basket. This insures adequate turnover of the clothes within the washing liquid. When the motor is reversed to operate the upper clutch shoe 37 its associated sheave 37a drives sheave 34 through the belt illustrated and the snubber idles against the rotating sheave 34. The gear frame 21 is thereby rotated as a unit, and basket 25 is driven at centrifuging speed.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. A bi-directional clutch comprising a pair of cup-like clutch drums arranged in opposing, axially spaced relationship for rotation on a reversible drive shaft, power take-off means for each of said drums, a drive shoe carrier mounted within the space defined by said drums for rotation on said drive shaft, said carrier having diametrically extending arms and pivot pin means projecting therefrom parallel with said drive shaft and of equal radii with respect thereto, a pair of arcuate drive shoe members individual to each said clutch drum and arranged in superimposed relation, the respective shoes of each pair being pivoted on opposite end pivot pins of said carrier for rotation into engagement respectively with diametrically opposite wall sectors of the associated drum under the influence of centrifugal force engendered by rotation of said carrier, said shoe members having elongate openings of substantial area, the openings of superimposed shoes overlapping to position the end of each opening remote from its shoe pivot point within a relatively large open area of the superimposed shoe, a driver member secured to said shaft in overlying relationship with said pairs of shoes, said member having drive fingers extending therefrom at opposite sides of said drive shaft and projecting through said openings for free traversal therealong to abut against the said remote end of a shoe opening according to the direction of rotation of said drive shaft to transmit driving torque through said shoe to said carrier while leaving the other of said superimposed shoes free to rotate into driving engagement with a clutch drum.

2. A clutch according to claim 1 in which during reversal of said drive shaft the drive fingers disengage from all of said shoes.

3. A clutch according to claim 1 in which the respective shoes are biased for disengagement from the associated clutch drum walls.

4. A bi-directional clutch comprising a pair of cup-like clutch drums arranged in opposing, axially spaced relationship for rotation on a reversible drive shaft, power take-off means from each of said drums, a drive shoe carrier mounted within the space defined by said drums for rotation on said drive shaft, said carrier having diametrically extending arms and pivot pin means projecting from the ends thereof parallel with said drive shaft, a pair of weighted drive shoe members individual to each said clutch drum and arranged in superimposed relation, the respective shoes of each pair being pivotally carried on opposite pivot pin means for rotation into engagement respectively with diametrically opposite wall portions of the associated drum under the influence of centrifugal force engendered by rotation of said carrier, the superimposed shoes having relatively long, wide openings therethrough arranged in overlapping relation and the radially innermost wall of each shoe opening at the end thereof remote from the shoe pivot point being formed with a pocket, and a driver member secured to said shaft, said member having equi-radially spaced drive fingers extending therefrom for free traversal along said arcuate openings and entry into the pocket of the upper or lower shoes according to direction of rotation of said drive shaft to hold the thus engaged shoe from engagement with a clutch drum, the overlapping opening of the remaining shoes leaving the same free for rotation about their respective carrier pivots; the transition of said drive fingers from one to the other of said pockets upon reversal of said drive shaft being without engagement with any of said drive shoes.

5. A bi-directional clutch, comprising a pair of cup-like clutch drums arranged in opposing axially spaced relationship for rotation on a reversible drive shaft, said drums having the same inside diameter and together forming a chamber, means for connecting said drums individually to a shaft to be driven, a drive shoe carrier mounted within said chamber for rotation on said drive shaft, said carrier having radially extending arms and pin means projecting therefrom parallel with said drive shaft and at equal radii with respect thereto, drive shoe members in pairs rotatably carried on said pin means in superimposed relationship, each of said pairs of drive shoes being individual to one of said clutch drums and having means for frictionally engaging the adjacent inner wall of its associated drum, the said superimposed drive shoes having mutually registering elongate arcuate openings therethrough, and a drive member secured to said shaft, said member having equi-radially spaced drive fingers extending therefrom for free traversal of said mutually registering openings to engage with the end walls of one or another of the openings of a pair of drive shoes according to direction of rotation of said drive shaft while permitting the other pair of shoes to rotate freely outwardly about said carrier pin means into driving engagement with the adjacent clutch drum wall under centrifugal forces engendered by rotation of said support member, the end walls of said clutch shoe openings being configurated to provide cam surfaces pursuant to which the engagement of the drive fingers with the ends of the clutch shoe openings as aforesaid holds said one pair of clutch shoes spaced from its associated clutch drum while using said spaced shoes as torque transmitting means between said driver member and said shoe carrier.

6. A bi-directional clutch, comprising a pair of cup-like clutch drums arranged in opposing, axially spaced relationship for rotation on a reversible drive shaft, means for connecting said drums individually to a shaft to be driven, a drive shoe carrier mounted within the space defined by said drums for rotation on said drive shaft, said carrier having radially extending arms and pin means projecting therefrom parallel with said drive shaft and of equal radii with respect thereto, a pair of weighted drive shoe members individual to each said clutch drum and arranged in superimposed relation, the respective shoes of each pair being pivoted on opposite end pins of said carrier for rotation thereabout respectively into driving engagement with diametrically opposite wall portions of the associated drum under the influence of centrifugal force engendered by rotation of said carrier, said shoe members having elongate, mutually overlapping openings, each said opening at the end thereof remote from the pivot point of its shoe being formed with an arcuate pocket which is within the area of the opening of its superimposed shoe, and a driver member secured to said drive shaft, said driver member having drive fingers extending therefrom at opposite sides of said drive shaft for free traversal along said shoe member openings to enter the pockets of a pair of shoes according to the direction of rotation of said drive shaft and hold said shoes from engagement with a clutch drum, the overlapping opening of the remaining shoes leaving said shoes free for engagement with their associated drum, whereby drive shaft torque is transmitted through said driver member and said mechanically held shoe to the carrier member and thence through the unrestrained shoe to the clutch drum.

7. A bi-directional clutch comprising a pair of cup-like clutch drums of similar inside diameter mounted in opposing relationship for rotation on a rotatable drive shaft, means for connecting each said drum to a driven shaft, a drive shoe carrier mounted for rotation on said drive shaft, said carrier having radially extending arms and pin means extending from said arms parallel with said drive shaft and at equal radii with respect thereto, a plurality of pairs of drive shoe members rotatably carried on said pin means in superimposed relationship, each of said pairs of drive shoes being associated with one of said clutch drums and having on their respective outer walls a body of friction material for engagement with the adjacent inner wall of the associated clutch drum, said superimposed drive shoes having mutually registering openings therethrough, and a driver member secured to said drive shaft, said driver member having equi-radially spaced drive fingers extending therefrom through the said mutually registering openings to engage the end walls of the openings of one or the other of a pair of drive shoes according to direction of drive shaft rotation to drive said carrier member at the speed of said drive shaft while permitting the other pair of shoes to rotate freely outwardly about said carrier pin means into driving engagement with the adjacent clutch drum wall under centrifugal forces engendered by rotation of said support member, the end walls of said clutch shoe openings being configurated to provide means engageable by said drive fingers to hold said one pair of clutch shoes out of engagement with its associated clutch drum while using said non-engaged shoes as torque transmitting means between said driver member and said shoe carrier.

8. A bi-directional clutch comprising a pair of cup-like clutch drums of similar inside diameter mounted in opposing axially spaced relationship on a reversible drive shaft, means for connecting each said drum to a driven shaft, and means for selectively driving a drum according to the rotation of said drive shaft, comprising a pair of drive shoe members individual to each said drum, means rotatable on said drive shaft and pivotally carrying said pairs of drive shoe members in mutually superimposed relation within said chamber whereby the drive shoe members of either pair may be rotated outwardly into engagement with the associated drum, a drive member fixed to said drive shaft for rotation therewith, and means for drivingly connecting said driver member to one or the other of said pairs of shoes according to the direction of shaft rotation while leaving the other pair of shoes free to rotate outwardly with respect to carrying means to drivingly engage the inner wall of the associated clutch drum, said driver member holding its thereto connected pair of shoes out of engagement with the clutch drum and using said shoes as link means to transmit torque from said drive shaft to said carrying means.

9. A bi-directional clutch comprising a pair of clutch drums arranged in axially spaced relation for rotation on a reversible drive shaft, power take-off means for each of said drums, carrier means disposed between said drums for rotation on said drive shaft, said carrier means having diametrically extending arms and pivot pins projecting therefrom at equal spacing from said drive shaft, a pair of weighted clutch drum driving members individual to each drum and arranged in superimposed relation, said driving members being pivotally carried on said pivot pins, each drive member of a pair being pivoted on a different pin of said carrier means and rotatable thereabout into torque transmitting engagement with diametrically opposite wall portions of the associated clutch drum by centrifugal forces engendered by rotation of said carrier, and driver means fixed to said shaft and having means engaging with the driving members of either pair according to the direction of rotation of said shaft, said driver means holding the thereby engaged pair of driving members away from its associated clutch drum without opposing rotation of the other pair into engagement with the other drum to transmit drive shaft torque thereto.

10. A bi-directional clutch comprising a pair of clutch drums arranged in axially spaced relation for rotation on a reversible drive shaft, power take-off means for each of said drums, carrier means disposed between said drums for rotation on said drive shaft, said carrier having radially extending arms and a pivot pin projecting therefrom at equal spacing from said drive shaft, a pair of clutch drum driving members individual to each drum, said driving members being pivotally carried on said pivot pins, each drive member of a pair being pivoted on a different pin of said carrier means and rotatable thereabout into torque transmitting engagement with wall portions of the associated clutch drum by centrifugal force engendered by rotation of said carrier, and driver means fixed to said shaft and having means engaging with the driving members of either pair according to the direction of rotation of said shaft, said driver means holding the thereby engaged pair of driving members away from its associated clutch drum while permitting the other pair to engage the other drum to transmit drive shaft torque thereto.

11. A bi-directional clutch comprising a pair of clutch elements arranged in axially spaced relation for rotation on a reversible drive shaft, power take-off means for each of said elements, carrier means disposed between said elements for rotation on said drive shaft, said carrier having diametrically extending arms and a pivot pin projecting from each arm at equal spacing from said drive shaft, a relatively heavy driving member individual to each clutch element, said driving members being arranged in superimposed relation on the respective pivot pins and rotatable thereabout into torque transmitting engagement with the associated clutch element by centrifugal forces engendered by rotation of said carrier, and driver means fixed to said shaft and having means engaging either driving member according to the direction of rotation of said shaft, said driver means holding the thereby engaged driving member away from its associated clutch element and releasing the other member for engagement with the other clutch element to transmit drive shaft torque thereto.

12. A combined bi-directional clutch and speed control means comprising a pair of clutch elements arranged in axially spaced relation for rotation on a reversible drive shaft, power take-off means for each of said elements, a drive shoe carrier disposed between said elements for rotation on said drive shaft, said carrier having diametrically extending arms and pivot pin means projecting therefrom at equal spacing from said drive shaft, a relatively heavy drive shoe individual to each said clutch element, said drive shoes being individually pivotally mounted on each pivot pin and arranged in superimposed relation for rotation into torque transmitting engagement with its associated clutch element by centrifugal forces engendered by rotation of said carrier, driver means fixed to said shaft and having means engaging either driving shoe according to the direction of rotation of said shaft, such engagement holding the shoe away from its associated clutch element, and spring means opposing rotation of each said drive shoe toward said clutch element.

13. A combined bi-directional clutch and speed control means comprising a pair of clutch elements arranged in axially spaced relation for rotation on a reversible drive shaft, power take-off means for each of said elements, a drive shoe carrier disposed between said elements for rotation on said drive shaft, said carrier having diametrically extending arms and pivot pin means projecting therefrom at equal spacing from said drive shaft, a relatively heavy drive shoe individual to each said clutch element, said drive shoes being individually pivotally mounted on each pivot pin and arranged in superimposed relation for rotation into torque transmitting engagement with its associated clutch element by centrifugal forces engendered by rotation of said carrier, driver means fixed to said shaft and having means engaging either driving shoe according to the direction of rotation of said shaft, such engagement holding the shoe away from its associated clutch element and transmitting torque to said drive shoe carrier, and spring means resiliently connecting the respective driving shoes whereby the engaged shoe anchors said spring to oppose rotation of the other shoe into engagement with the clutch element until centrifugal forces acting on said other shoe are effective to overcome the bias of said spring.

JACOB W. McNAIRY.

References Cited in the file of this patent

UNITED STATES PATENTS

| Number | Name | Date |
|---|---|---|
| 2,158,873 | Kaltwasser | May 16, 1939 |
| 2,235,266 | Starkey | Mar. 18, 1941 |
| 2,485,211 | Mesh | Oct. 18, 1949 |
| 2,511,681 | Young | June 13, 1950 |
| 2,517,088 | Dayton | Aug. 1, 1950 |
| 2,527,238 | Woodson | Oct. 24, 1950 |

FOREIGN PATENTS

| Number | Country | Date |
|---|---|---|
| 928,030 | France | Nov. 17, 1947 |